3,055,839
COBALT OXIDATION CATALYST
John J. Melchiore, Wallingford, Pa., assignor to Sun Oil Company, Philadelphia, Pa., a corporation of New Jersey
No Drawing. Filed Nov. 12, 1959, Ser. No. 852,197
2 Claims. (Cl. 252—431)

This invention relates to an oxidation catalyst and deals with a method for the preparation of this catalyst. More particularly the invention relates to the preparation of a cobalt composition containing cobaltic ion which is especially effective for the conversion of aromatic mono-acids to di-acids.

In the past simple cobaltic salts have been produced from cobaltous salts only by the action of the strongest oxidizing agents, such as electrolytic oxidation, or treatment of cobaltous salts in solution with fluorine, ozone, or with reagents such as sodium bismuthate. Complex cobaltic salts have been produced in the presence of such complexing groups as hydroxyl, amine or cyanide.

It is the object of this invention to convert cobaltous salts to cobaltic salts by treating a solvent solution of the cobaltous salt with oxygen.

The cobaltic salts of this invention cannot be prepared merely by bubbling oxygen through any hot fatty acid solution of a cobaltous salt. For example, I have tried to prepare cobaltic acetate by bubbling oxygen through a hot or refluxing solution of cobaltous acetate in acetic acid without success. The purple color of cobaltous ion persists throughout the oxidation period and no cobaltic ion can be detected polarographically. However, I have found that when propionic acid is used as the solvent, the initial purple color of cobaltous ion is discharged to the dark green color of cobaltic ion in 15 minutes. After a few hours, a dark green solid precipitates. Polarographic analysis of this dark green solid indicates the presence of cobaltic ion as well as cobaltous ion.

The green solid is insoluble in water and dilute HCl, only slightly soluble in propionic acid, but is soluble in concentrated HCl. In solution the cobaltic salt will oxidize ferrous ammonium sulfate to $Fe^{+3}$ as follows:

$$Co^{+3} + Fe^{+2} \rightarrow Co^{+2} + Fe^{+3}$$

In a typical preparation according to the invention 12.2 gm. of cobaltous acetate tetrahydrate and 125 mls. of propionic acid were heated in a Morton flask to reflux, during which time nitrogen was bubbled through the solution with stirring by means of a motor-driven stirrer. While nitrogen was bubbled through the solution the liquid remained dark purple. Oxygen was then bubbled through the solution at a rapid rate. After a few minutes the solution turned dark green. Oxidation was continued for 3 hours. After cooling, 8.5 g. of a dark green solid was isolated by filtration and vacuum drying. Analysis disclosed elemental cobalt 31.2%, carbon 31.0%, hydrogen 4.6% and oxygen 33.2% by difference.

I have found that the molar concentration of cobalt acetate tetrahydrate in propionic acid must be approximately 0.2 molar or greater. At lower concentrations (e.g. 0.05 M) the solution remains purple and contains no cobaltic ions. The upper limit of cobalt acetate concentration is not critical but is obviously limited by the solubility of cobalt acetate in propionic acid at the prevailing solution temperature.

A temperature range of 115 to 150° C. is suitable for the catalyst preparation reaction, with a range of 120 to 135° C. being preferred.

Ordinarily, the reaction is conducted at atmospheric pressure since pressure is not critical. Higher pressures may be used if desired.

Oxygen is desirably supplied at a rate of about 2.0 to 3.0 liters per 100 grams of cobalt acetate per minute. Better contact of the oxygen with the cobalt is obtained by the use of a motor-driven stirrer operating at 500 to 2000 r.p.m.

The catalyst of the present invention is important in the conversion of aromatic mono-acids to di-acids. More specifically cobaltic ion has been found to be very effective in the conversion of mono-acids of 2,6-dimethylnaphthalene to di-acids by oxidation with oxygen. The table below shows the effect of the addition of green cobaltic material to the oxidation of the said mono-acids.

TABLE I

*Oxidation of 6-Methyl-2-Naphthoic Acid to 2,6-Naphthalene Dicarboxylic Acid*

[300 cc./min. = $O_2$; stirring = 1300 r.p.rm; 250 mls, propionic acid; 25 g. monoacid]

| Run | Description | Time (hrs.) | Temp., °C. | Weight Percent Monoacid | Diacid |
|---|---|---|---|---|---|
| 1 | 12.5 g. $Co(AOc)_2.4H_2O$ | 0 | 128 | 90 | 10 |
|   |   | 6 | 128–127 | 89.5 | 10.5 |
|   |   | 15 | 126–132 | 88 | 12 |
| 2 | 3.1 g. cat. reacted with $O_2$ in propionic acid for 2 hrs.,[a] then 9.4 g. $Co(OAc)_2.4H_2O$ and monoacids added. | 0 | 122 | 100 | 0 |
|   |   | 6 | 122–117 | 86 | 14 |
|   |   | 15 | 117–116 | 86 | 14 |
|   |   | 21.5 | 116–115 | 86 | 14 |
| 3 | 6.25 g. cat. converted to green sol'n in propionic acid,[b] then 6.25 g. $Co(OAc)_2.H_2O$ and monoacids added. | 0 | 126 | 100 | 0 |
|   |   | 6 | 126–117 | 89 | 11 |
|   |   | 15 | 119–117 | 61 | 39 |
|   |   | 23 | 117–116 | 54 | 46 |
| 4 | 6.25 g. green solid [c] + 6.25 g. $Co(OAc)_2.4H_2O$. | 0 | 130 | 97 | 3 |
|   |   | 6 | 130–120 | 93 | 7 |
|   |   | 15.5 | 120–117 | 67 | 33 |
|   |   | 23 | 117 | 52 | 48 |
| 5 | 9.4 g. cat. converted to green sol'n, [b] then 3.1 g. $Co(OAc)_2.4H_2O$ and monoacids added. | 0 | 120 | 100 | 0 |
|   |   | 6 | 120–121 | 73 | 27 |
|   |   | 15 | 121–119 | 65 | 35 |
|   |   | 21.5 | 119 | 53 | 47 |
| 6 | 12.5 g. cat. converted to green sol'n, then add monoacids. | 0 | 128 | 97 | 3 |
|   |   | 6 | 128–123 | 82 | 18 |
|   |   | 14 | 123–120 | 73 | 27 |

[a] 3.1 g. $Co(OAc)_2.4H_2O$ in refluxing propionic acid remained purple after 2 hours of interaction with oxygen.
[b] A portion of $Co(OAc)_2.4H_2O$ reacted with $O_2$ for 1 hour in refluxing propionic acid during which time solution turns from a deep purple color to a dark green color.
[c] Green solid prepared by reacting 12.2 g. $Co(OAc)_2.4H_2O$ in 125 mls. refluxing propionic acid with $O_2$ for 3 hours. 8.5 g. of green solid was obtained after filtering and vacuum drying.

Cobaltic ion can be used as such or it may be added to a cobaltous acetate catalyst to achieve greater conversion. The catalyst of the present invention is also useful for the oxidation of 2,6-dimethylnaphthalene to the monoacid.

The invention claimed is:
1. A process for the preparation of a cobalt oxidation catalyst containing cobaltic ions which comprises heating a solution consisting essentially of cobaltous acetate at a molar concentration of at least 0.2 in a propionic acid solvent in the presence of oxygen at a temperature in the range of from about 115 to 150° C. until the color of the solution changes from purple to green.
2. The process according to claim 1 wherein the green solution is filtered and the filter cake vacuum dried to obtain the said oxidation catalyst in solid form.

References Cited in the file of this patent
UNITED STATES PATENTS

| 1,976,757 | Walker et al. | Oct. 16, 1934 |
| 2,588,388 | Hull | Mar. 11, 1952 |